United States Patent [19]

Kudo

[11] Patent Number: 5,278,830
[45] Date of Patent: * Jan. 11, 1994

[54] DATA PACKET COMMUNICATION SYSTEM IN WHICH DATA PACKET TRANSMITTAL IS PRIORITIZED WITH QUEUES HAVING RESPECTIVE ASSIGNED PRIORITIES AND FREQUENCY WEIGHTED COUNTING OF QUEUE WAIT TIME

[75] Inventor: Norimasa Kudo, Kawasaki, Japan

[73] Assignee: Kabushiki Kaisha Toshiba, Kawasaki, Japan

[*] Notice: The portion of the term of this patent subsequent to Jan. 12, 2000 has been disclaimed.

[21] Appl. No.: 885,764

[22] Filed: May 20, 1992

Related U.S. Application Data

[62] Division of Ser. No. 546,111, Jul. 2, 1990, Pat. No. 5,179,557.

[30] Foreign Application Priority Data

Jul. 4, 1989 [JP] Japan .................................. 1-172520
Sep. 27, 1989 [JP] Japan .................................. 1-251655

[51] Int. Cl.⁵ ............................................. H04J 3/24
[52] U.S. Cl. ................................. 370/94.1; 370/85.6; 370/60

[58] Field of Search ...................... 370/60.1, 60, 94.1, 370/85.6, 85.9, 61, 94.3, 58.1

[56] References Cited

U.S. PATENT DOCUMENTS 4,769,810 9/1988 Eckberg, Jr. et al. ................ 370/60
4,769,811 9/1988 Eckberg, Jr. et al. ................ 370/60
4,942,569 7/1990 Maeno ................................ 370/85.6

FOREIGN PATENT DOCUMENTS

1427319 5/1972 United Kingdom .................. 370/61

Primary Examiner—Douglas W. Olms
Assistant Examiner—Shick Hom
Attorney, Agent, or Firm—Finnegan, Henderson, Farabow, Garrett & Dunner

[57] ABSTRACT

A packet communication system in accordance with the present invention wherein, when the system receives packets each made up of a predetermined unit data from a plurality of terminals, these packets are arranged to once form a packet queue, the packets in the packet queue are sequentially and selectively transmitted, and the selection of one of the packets of the packet queue to be immediately transmitted is determined through simple operation, whereby high speed processing can be realized and discardable packets in the packet queue can be selectively discarded with high freedom.

3 Claims, 8 Drawing Sheets

[INITIAL STATE]

FIG. 4 (a)

[PACKET ARRIVAL]

DATA PACKET COMMUNICATION SYSTEM IN WHICH DATA PACKET TRANSMITTAL IS PRIORITIZED WITH QUEUES HAVING RESPECTIVE ASSIGNED PRIORITIES AND FREQUENCY WEIGHTED COUNTING OF QUEUE WAIT TIME

This is a division of application Ser. No. 07/546,111, filed Jul. 2, 1990, now U.S. Pat. No. 5,179,557.

BACKGROUND OF THE INVENTION

1. Field of the Invention

The present invention relates to a packet communication system which, when receives unit packets each corresponding to a predetermined amount of data from a plurality of terminals, arranges these packets to once form a packet queue, sequentially selects packets from the packet queue, and sequentially transmits them.

2. Description of the Related Art

Figure 5:
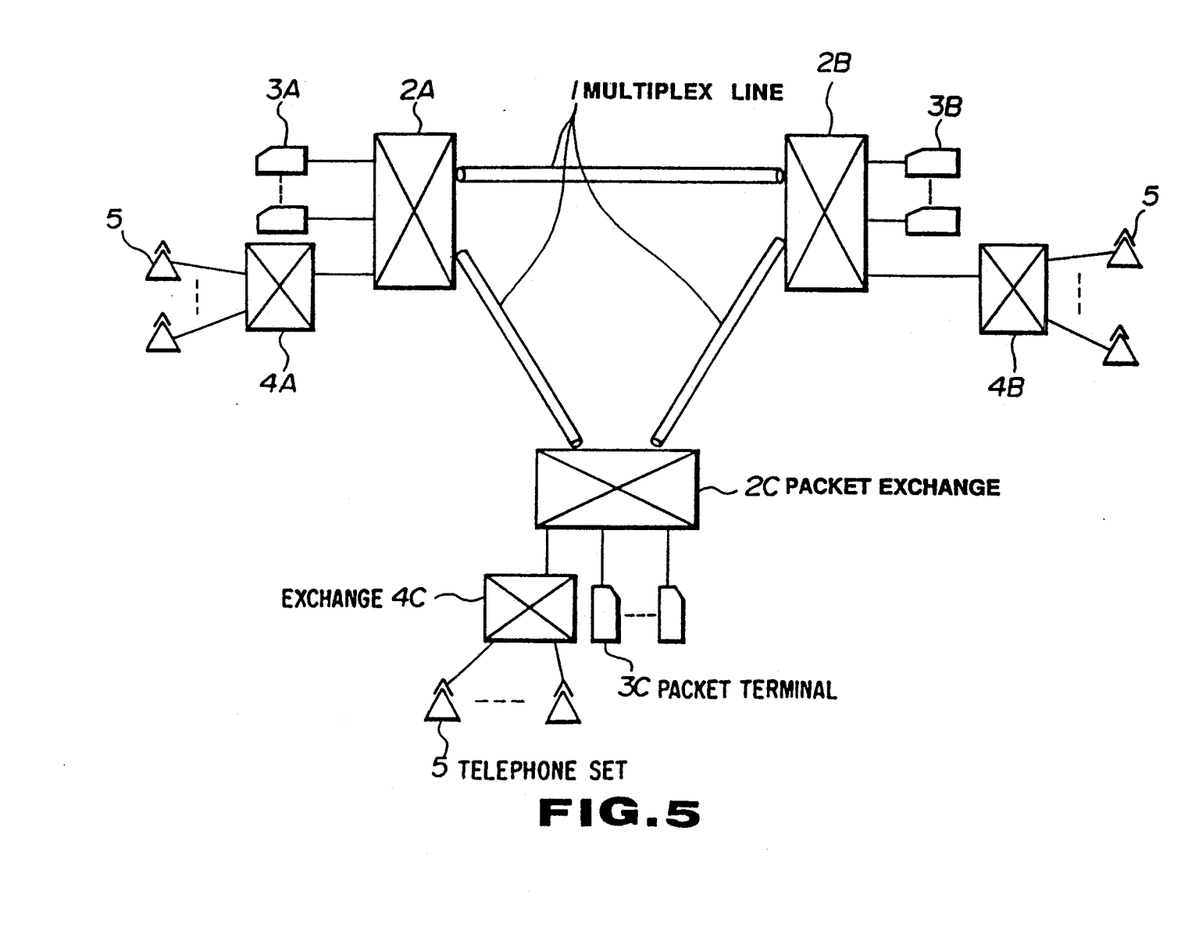
FIG. 5 shows, in a block diagram, an example of a packet communication network.

An example of systems of transmitting voice data on a packet basis is shown in FIG. 5. The system of FIG. 5 includes multiplex lines 1, packet exchanges 2A, 2B and 2C, packet terminals 3A, 3B and 3C, exchanges 4A, 4B and 4C, and telephone sets 5. In the system, a voice data inputted to, for example, the packet terminal 3A is encoded, divided into predetermined data units, assembled into packets attached with a party destination data and then transmitted to the party packet terminal 3B through the packet exchange 2A and 2B.

Figures 6, 7:
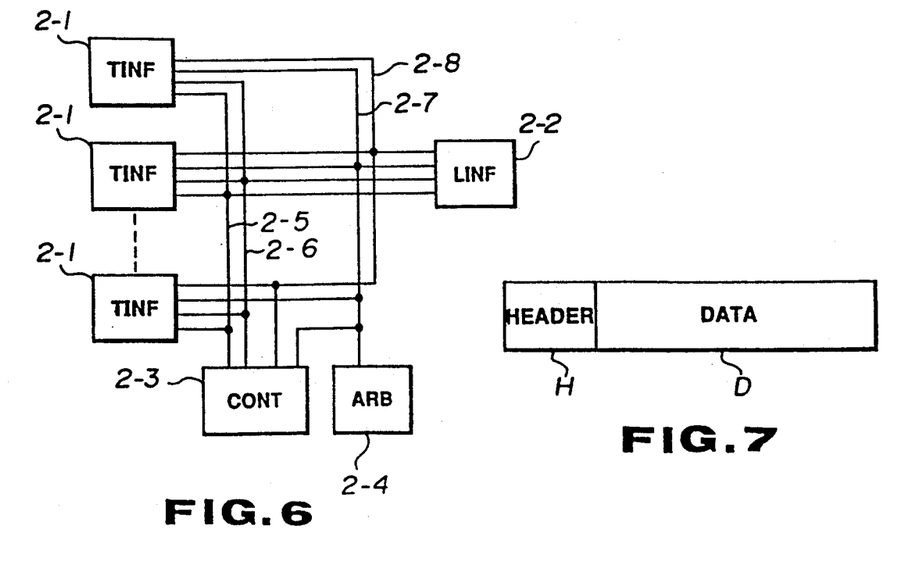
FIG. 6 is a block diagram of an arrangement of a packet exchange used in FIG. 5.
FIG. 7 is a diagram for explaining the structure of a packet.

Referring next to FIG. 6, there is shown a block diagram of interior arrangement of one of the packet exchanges 2A to 2C, which includes terminal interfaces 2-1 provided as associated with the respective packet terminals, a line interface 2-2 with respect to the multiplex lines 1, a controller 2-3, a bus access controller 2-4, an interrupt control bus 2-5, a control bus 2-6, an access control bus 2-7, and a data bus 2-8. Each of the terminal interfaces 2-1, when receiving a calling packet from the associated packet terminal connected thereto, issues an interrupt command to the controller 2-3 via the interrupt control bus 2-5. The controller 2-3, when confirming the reception of an interrupt command, gets access to a memory (not shown) provided within the terminal interface 2-1 through the control bus 2-6 and confirms the calling data indicative of the party number, window size (the number of packets per unit time transmittable to the party side) and so on. Thereafter, the controller 2-3 outputs to the access control bus 2-7 an access request to the data bus 2-8 to transmit a connection request packet to the opposing node (exchange) of the party packet terminal. After having gotten an access authority, the controller 2-3 transmits the connection request packet to the line interface 2-2 through the data bus 2-8. At this time, the line interface 2-2 itself assembles the connection request packet like the data packet and sends it onto the multiplex line 1. The line interface 2-2, when receiving a connection approval or disable packet from the opposing node, sends the received packet to the controller 2-3. When the controller 2-3 receives, for example, the connection approval packet, the controller causes a connection table to be created in a memory (not shown) provided between the line interface 2-2 and the terminal interface 2-1 and at the same time, the controller sends the connection approval packet to the terminal interface 2-1. The terminal interface 2-1, when receiving the connection approval packet from the controller 2-3, sends the connection approval packet to the associated packet terminal, after which the packet exchange is shifted to its data transfer phase. In this phase, the terminal interface 2-1 sends a data packet to the line interface 2-2 through the data bus 2-8. In this case, the data packet sent to the line interface 2-2 has such a header part H attached to a data part D as shown in FIG. 7 based on the connection table created by the controller 2-3. The line interface 2-2, after storing the received data packet in its buffer, transmits the data packet to the multiplex line 1. The above operation is repeated similarly with respect to the subsequent data packets in the data transfer phase. Even when the controller 2-3 receives the connection disapproval packet (disconnection mode), substantially the same operation holds true for the connection request mode, except that the connection table is deleted.

Figure 8:
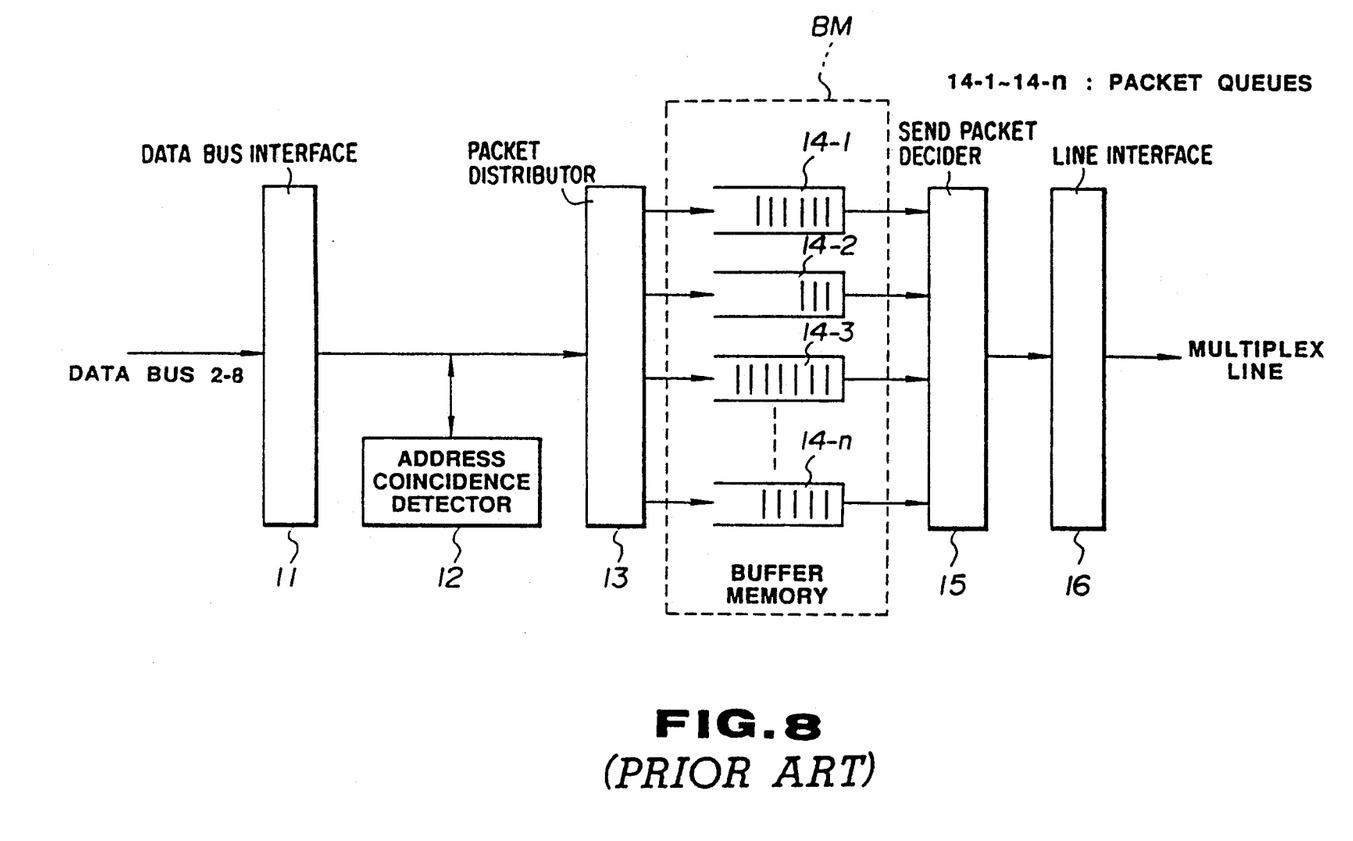
FIG. 8 is a block diagram of a prior art line interface used in FIG. 6.

FIG. 8 shows the interior arrangement of the line interface 2-2 (with arrows directed only to the multiplex line). The illustrated line interface includes a data bus interface 11, an address coincidence checker 12, a packet distributing part 13, a buffer memory BM having a plurality of rows of packet queues 14-1 to 14-n stored therein, a send packet decider 15, and a lien interface 16. The data bus interface 11, which is provided for interface with the data bus 2-8 of FIG. 6, sends or receives packets at the timing of the data bus 2-8. The address coincidence checker 12 decides by comparison whether or not the received packet is destined for its own line interface, so that, when the received packet is destined for its own, the checker 12 transfers the received packet to the packet distribution part 13 and otherwise, the checker 12 discards the packet. The packet distribution part 13 decides on the basis of the information of the header part H of the received packet in which one of the packet queues 14-1 to 14-n the received packet is to be stored. The information of the header part H includes data associated with the connection and priority data on immediateness and discarding rate. The packet distribution part 13 distributes the packet to any one of the packet queues 14-1 to 14-n according to, for example, the priority data of these header data H. The send packet decider 15 is used to determine one of the packet queues 14-1 to 14-n from which a packet is to be extracted. The line interface 16, which forms an interface with the multiplex line 1, sends the extracted packet onto the multiplex line in synchronism with the clock of the line.

Figure 9:
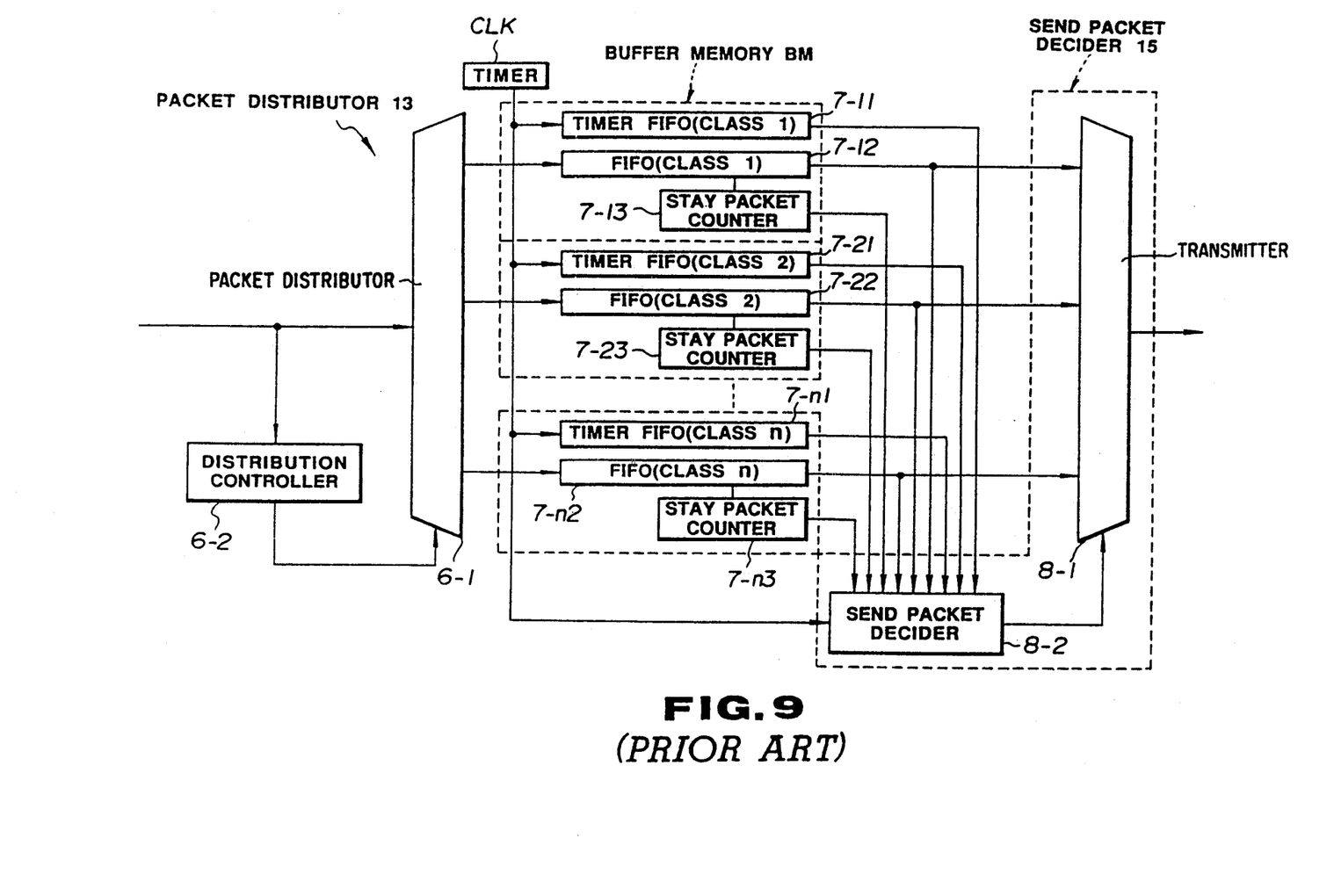
FIG. 9 is a block diagram showing a major part of the line interface of FIG. 8.

Shown in FIG. 9 is the details of the packet distribution part 13 and buffer memory BM in FIG. 8, which includes a packet distributor 6-1, a distribution controller 6-2, a timer CLK, timer buffer memories 7-11 to 7-n1 for sequentially storing therein and outputting a time from the timer CLK in the first-in first-out (FIFO) manner, data buffer memories 7-12 to 7-n2 for sequentially storing therein and outputting a packet in the FIFO manner, staying-packet counters 7-13 to 7-n3 for counting the numbers of packets stored in the data buffer memories, a transmitter 8-1, and a send/discard packet decider 8-2.

More specifically, the packet distributor 6-1 receives a packet from the data bus interface 11 of FIG. 8 and distributingly sends the received packet to any one of the data buffer buffer memories 7-12 to 7-n2. The distribution controller 6-2 identifies the priority data designated by the header part H of the packet received from the data bus interface 11, and instructs the packet distributor 6-1 to distribute the packet to the data buffer memory designated by the priority data. For example, assume that the priority data has classes 1 to n which are associated with the data buffer memories 7-12 to 7-n2 respectively. Then a packet having the priority data of class 1 is sent from the packet distributor 6-1 to the data buffer memory 7-12, a packet having the priority data of class 2 is sent from the packet distributor 6-1 to the data buffer memory 7-22, and similarly a packet having the priority data of class n is sent from the packet distributor 6-1 to the data buffer memory 7-n2.

The data buffer memories 7-12 to 7-n2 sequentially store the respective packets distributed by the packet distributor 6-1, whereby packet queues of the classes 1 to n are formed in the data buffer memories 7-12 to 7-n2 respectively.

Each time a packet is input to the data buffer memory 7-12, the timer buffer memory 7-11 sequentially stores therein a time from the timer CLK. Similarly, each time a packet is input to the data buffer memory 7-n2, the data buffer memory 7-12 sequentially stores therein a time from the timer CLK. As a result, series or rows of times (time rows) are formed in the respective timer buffer memories 7-11 to 7-n1 and correspond to the associated packet queues within the data buffer memories 7-12 to 7-n2. More in detail, for example, the heading times of the time rows in the timer buffer memories 7-11 to 7-n1, that is, the first-input times indicate the input times of the heading packets in the respective packet queues which are located at their heads or are first input.

The transmitter 8-1 sequentially reads out the heading packets from any of the data buffer memories 7-12 to 7-n2 and sequentially transmits the read-out packets. The send/discard packet decider 8-2, when it is in its send control mode, selects one of the heading packets within the data buffer memories 7-12 to 7-n2 to be immediately transmitted, on the basis of the current time received from the timer CLK, the heading times in the respective timer buffer memories 7-11 to 7-n1, and the classes 1 to n of the data buffer memories 7-12 to 7-n2, and the decider 8-2 instructs the transmitter 8-1 to extract the selected heading packet. That is, the transmitter 8-1 extracts the instructed packet from the data buffer memories and transmits it.

Selection of the heading packet done at the send/discard packet decider 8-2 is carried out in accordance with the following expression (1).

$$\text{Max } \{D1W1, D2W2, \ldots, DjWj, \ldots, DnWn\} \quad (1)$$

$$1 \leq j \leq n$$

where $Dj$ denotes a time during which the heading packet within the data buffer memory of class $j$ stays therein and which corresponds to a difference between the heading time within the timer buffer memory associated with the data buffer memory, i.e., the input time of the heading packet and the current time. In addition, $Wj$ denotes a weight factor previously given to the class $j$ and satisfies the following relationship.

$$Wj-1 > Wj > Wj+1$$

That is, the respective values $D1W1$ to $DnWn$ in the expression (1) are found with respect to the respective heading packets within the data buffer memories 7-12 to 7-n2. One of the packets corresponding to the maximum of these values $D1W1$ to $DnWn$ is selected as a packet to be immediately transmitted and the selected packet is transmitted from the transmitter 8-1. Such operation is sequentially carried out for every packet transmission.

The selection of a packet to be immediately transmitted according to the expression (1) is a directest and proper method to secure the transmission quality. This method, however, must perform subtraction operation to calculate the value $Dj$, multiplication operation to calculate, and comparison operation to find a maximum among the values $D1W1$ to $DnWn$; thus the send packet decider 8-2 must perform a considerable amount of operation $O(3n)$ for every packet. For this reason, the method has been defective in that the processing ability of the send packet decider 8-2 becomes insufficient, high speed processing is impossible and the upper limit of the class number n is restricted by such conditions. In addition, the method has such a demerit that, although calculators for the subtraction and multiplication may be dispersedly provided for the respective data buffer memories, such an arrangement requires a very large scale of hardware, which results in that it is impossible to realize a simplified arrangement of the same circuit units with difficult system integration and poor applications.

Explanation will next be made as to how the send/discard packet decider 8-2 performs the discarding control. The staying-packet counters 7-13 to 7-n3 count the numbers of packets staying in the respective data buffer memories of classes 1 to n. The number of packets accumulatable in each of the data buffer memories 7-12 to 7-n2 is limited to a specific value in the illustrated example. Thus when the data buffer memory 7-j2 of class j is full of packets, input of a new packet to the data buffer memory 7-j2 causes its overflow. For this reason, in the discarding control, when the number of packets staying in the data buffer memory 7-j2 of class j exceeds a predetermined value, the data buffer memory discards one of the stay packets which has the longest stay time, that is, the heading packet.

The above discarding operation, however, is carried out without discriminating the packet connection, i.e., the transmission route of that packet, thus resulting in that, when packets in the data buffer memory 7-j2 of class j abruptly increase in number, there is a danger that the data buffer memory 7-j2 might continuously discard many packets flowing through the same connection. When many packets flowing through the same connection are continuously discarded in this way, this involves such a problem that the communication quality of the connection is remarkably deteriorated. As one of methods of avoiding this problem, it is considered, when it is desired to discard packets on a connection, to discard the packets only after passage of a predetermined time. In this method, however, the data buffer memory 7-j2 of FIFO type cannot select and discard packets other than the heading packet as mentioned above and any consideration does not lead to paying to the connection.

In this way, the prior art packet communication system has a problem that, when a packet in any one of a plurality of packet queues to be immediately transmitted is to be determined, the send packet decider must perform the subtraction and multiplication for each of the packet queues as well as comparison between products of the subtraction and multiplication, thus making it impossible to realize high-speed calculation processing. For attaining high-speed calculation processing, it is possible to provide a calculating part for each of the packet queues, but such dispersion of calculating parts disables the realization of a simplified arrangement of the same circuit units with difficult integration of the system.

With respect to the packet discarding control, on the other hand, the FIFO type data buffer memory cannot select and discard packets other than the leading packet, which may undesirably result in that the data buffer memory continuously discards many packets flowing through the same connection, in which case the communication quality of the connection is deteriorated to a large extent.

SUMMARY OF THE INVENTION

It is therefore an object of the present invention to provide a packet communication system which can select a packet to be immediately transmitted through high-speed calculation and wherein a circuit for the calculation can be made in the form of an integrated circuit.

Another object of the present invention is to provide a packet communication system which can selectively discard ones of packets in a packet queue which may be discarded while preventing the deterioration of the communication quality.

In accordance with an aspect of the present invention, there is provided a packet communication system which sequentially receives packets each made up of a predetermined unit data, arranges the packets to form a packet queue, selects any one of the packets in the packet queue and sequentially transmits the selected packet; and which system comprises timer means for starting its time measuring operation each time a packet is received and arranged in the packet queue to measure a stay time of the received packet staying in the packet queue, and selection means for selecting one of the packets in the packet queue on the basis of the stay time of each packet.

In the present invention, since the stay times for the respective packets arranged in the packet queue are found, one of the packets to be immediately transmitted is selected on the basis of the respective stay times.

In accordance with another aspect of the present invention, there is provided a packet communication system which sequentially arranges packets each made up of a predetermined unit data to form a packet queue, selects any of the packets in the packet queue to sequentially transmit the selected packet, and when a remaining capacity of the packet queue becomes smaller than a predetermined value, discards any of the packets in the packet queue. And the system comprises measuring means for discriminating a plurality of predetermined discard classes to which the packets of the packet queue respectively belong, and for measuring flow rates of the packets for the discriminated discard classes; product calculation means for calculating products of the respective packet flow rates of the discard classes measured by said measuring means and allowable discard rates previously set for the discard classes with respect to the respective discard classes; and discarding means for finding maximum one of the products of the discard classes calculated by said product calculation means and for discarding one of the packets of the packet queue belonging to the discard class corresponding to the found maximum product.

In the present invention, since maximum one of the products of the packet flow rates for the respective discard classes and the allowable discard rates is determined to discard the packet of the discard class corresponding to the maximum product, suitable packet discarding can be realized.

DESCRIPTION OF THE PREFERRED EMBODIMENT

Figure 1:
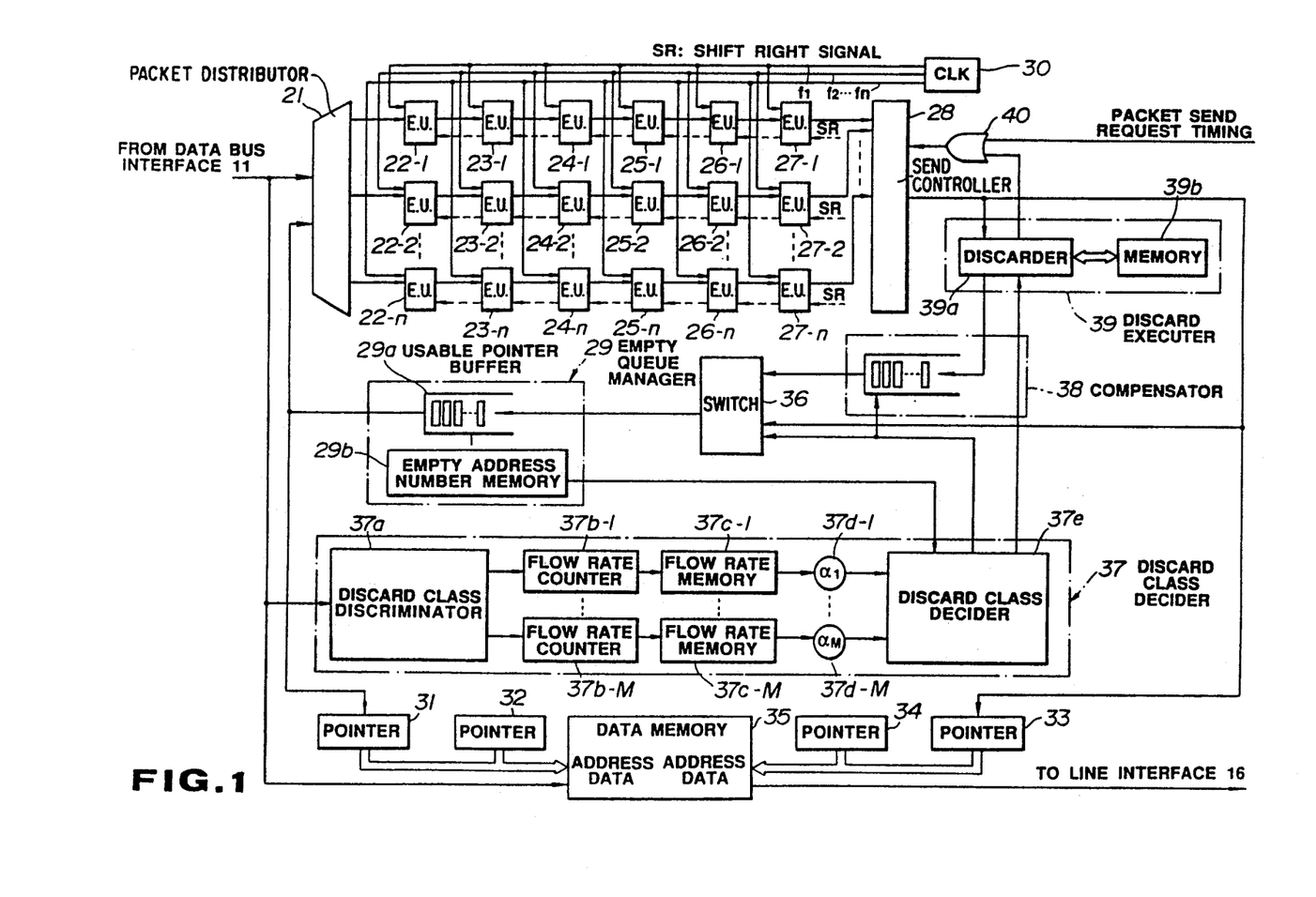
FIG. 1 is a block diagram showing an embodiment of a packet communication system of the present invention.

Referring to FIG. 1, there is shown a block diagram of an inventive part of a packet communication system in accordance with an embodiment of the present invention, which corresponds to the prior art packet distributing part 13, buffer memory BM and send packet decider 15 of FIG. 8. The circuit of FIG. 1 includes a packet distributor 21, elemental units 22-1 to 27-1. 22-2 to 27-2, ..., and 22-n to 27-n each made up of a register, a counter and so on, a send controller 28, an empty queue manager 29, a clock generator 30, a write packet pointer 31, a write intra-packet pointer 32, a read packet pointer 33, a read intra-packet pointer 34, a data memory 35, a switch 36, a discard class decider 37, a compensator 38, a discard executer 39, and an OR circuit 40.

The empty queue manager 29 has a usable pointer buffer 29a and an empty address number memory 29b. The usable pointer buffer 29a, which stores therein an empty address queue Qempty consisting of a plurality of addresses, sends the heading address in the empty address queue Qempty to the data memory 35 through the packet distributor 21 and the write packet pointer 31 and also places an address received through the switch 36 from the send controller 28 at the end of the empty address queue Qempty, thereby updating the empty address queue Qempty. The empty address number memory 29b always stores therein the number of addresses in the empty address queue Qempty.

The data memory 35 receives a packet from the data bus interface 11 in FIG. 8 and writes therein the received packet according to an address designated by the usable pointer buffer 29a through the write packet pointer 31 as a starting point. In writing the data based on the address, the write intra-packet pointer 32 sequentially counts up the address and instructs the data memory 35 to fully store a predetermined length of data. The data memory 35 also reads out therefrom a packet according to an address designated by the send controller 28 through the read packet pointer 33 as a starting point and sends the read-out packet to the line interface 16 in FIG. 8. In reading out the data based on the address, the read intra-packet pointer 34 sequentially counts up the address and instructs the data memory 35 to fully store a predetermined length of data.

The packet distributor 21 discriminates the priority data indicated in the header part H (refer to FIG. 7) of the same packet as that received at the data memory 35, and selects one of the leading elemental units 2-1, 22-2, ..., and 22-n on the basis of the discriminated priority data. And the packet distributor 21 receives the same address as that designated by the data memory 35 from the usable pointer buffer 29a and sends the received address to the selected leading elemental unit together with the header H of the packet. Assume, for example, that immediateness classes 1, 2, ..., and n are associated with the elemental units 22-1, 22-2, ..., and 22-n and the priority data indicates any one of the immediateness classes 1, 2, ..., and n. Then when a packet containing a priority data of immediateness class 1 is written in the data memory 35 at its predetermined address, the header H of the packet and the address are sent to the elemental unit 22-1 of immediateness class 1. While, when a packet containing a priority data of immediateness class 2 is written in the data memory 35 at its predetermined address, the header H of the packet and the address are sent to the elemental unit 22-2 of immediateness class 2. Similarly, when a packet containing priority data of immediateness class n is written in the data memory 35 at its predetermined address, the header H of the packet and the address are sent to the elemental unit 22-n of immediateness class n. Such processing is repetitively carried out each time a packet is stored in the data memory 35. At this time, if next-upper one in the first row of elemental units 22-1 to 27-1 is empty, then the header H of the packet and the address are sequentially shifted to the next upper unit. Similarly, if next-upper one in the second, ..., or n-th row of elemental units 22-2 is empty, then the header H of the packet and the address are sequentially shifted to the next upper unit. As a result, the headers H and addresses of packets belonging to the immediateness class 1 are sequentially stored in the first row of elemental units 22-1 to 27-1 to thereby form a header/address queue. When the packets in the data memory 35 designated by the respective addresses of the header/address queue are arranged in their address order, a packet queue of immediateness class 1 is formed. The headers H and addresses of packets belonging to the immediateness class 2 are sequentially stored in the second row of elemental units 22-2 to 27-2 to thereby form a header/address queue. When the packets in the data memory 35 designated by the respective addresses of the header/address queue are arranged in their address order, a packet queue of immediateness class 2 is formed. Similarly, the headers H and addresses of packets belonging to the immediateness class n are sequentially stored in the second row of elemental units 22-n to 27-n to thereby form a header/address queue. When the packets in the data memory 35 designated by the respective addresses of the header/address queue are arranged in their address order, a packet queue of immediateness class n is formed.

Clock signals having frequencies set differently with respect to the respective first and n-th rows of elemental units, i.e., with respect to the different immediateness classes are applied from the clock generator 30. For example, the clock signal of a frequency f1 corresponding to the immediateness class 1 is applied to the first row of elemental units 22-1 to 27-1; the clock signal of a frequency f2 corresponding to the immediateness class 2 is applied to the second row of elemental units 22-2 to 27-2: and similarly the clock signal of a frequency fn corresponding to the immediateness class n is applied to the n-th row of elemental units 22-n to 27-n.

In the first row of elemental units 22-1 to 27-1, each time the first elemental unit 22-1 receives the header H and its address, the unit starts their counting in synchronism with the clock signal of the frequency f1 and the respective elemental units continue the counting of the header H and address until the last elemental unit 27-1 extracts the input header H and address. In the second row of elemental units 22-2 to 27-2, each time the first elemental unit 22-2 receives the header H and its address, the unit starts their counting in synchronism with the clock signal of the frequency f2 and the respective elemental units continue the counting of the header H and address until the last elemental unit 27-2 extracts the input header H and address. Similarly, in the n-th row of elemental units 22-n to 27-n, each time the first elemental unit 22-n receives the header H and its address, the unit starts their counting in synchronism with the clock signal of the frequency fn and the respective elemental units continue the counting of the header H and address until the last elemental unit 27-n extracts the input header H and address. Accordingly, the last elemental unit 27-1 in the first row indicates a count value D'1 that has been counted in synchronism with the clock signal having the frequency f1 during stay of the header H and address in the first unit row; the last elemental unit 27-2 in the second row indicates a count value D'2 that has been counted in synchronism with the clock signal having the frequency f2 during stay of the header H and address in the second unit row; and similarly the last elemental unit 27-n in the n-th row indicates a count value D'n that has been counted in synchronism with the clock signal having the frequency fn during stay of the header H and address in the n-th unit row.

Figure 2:
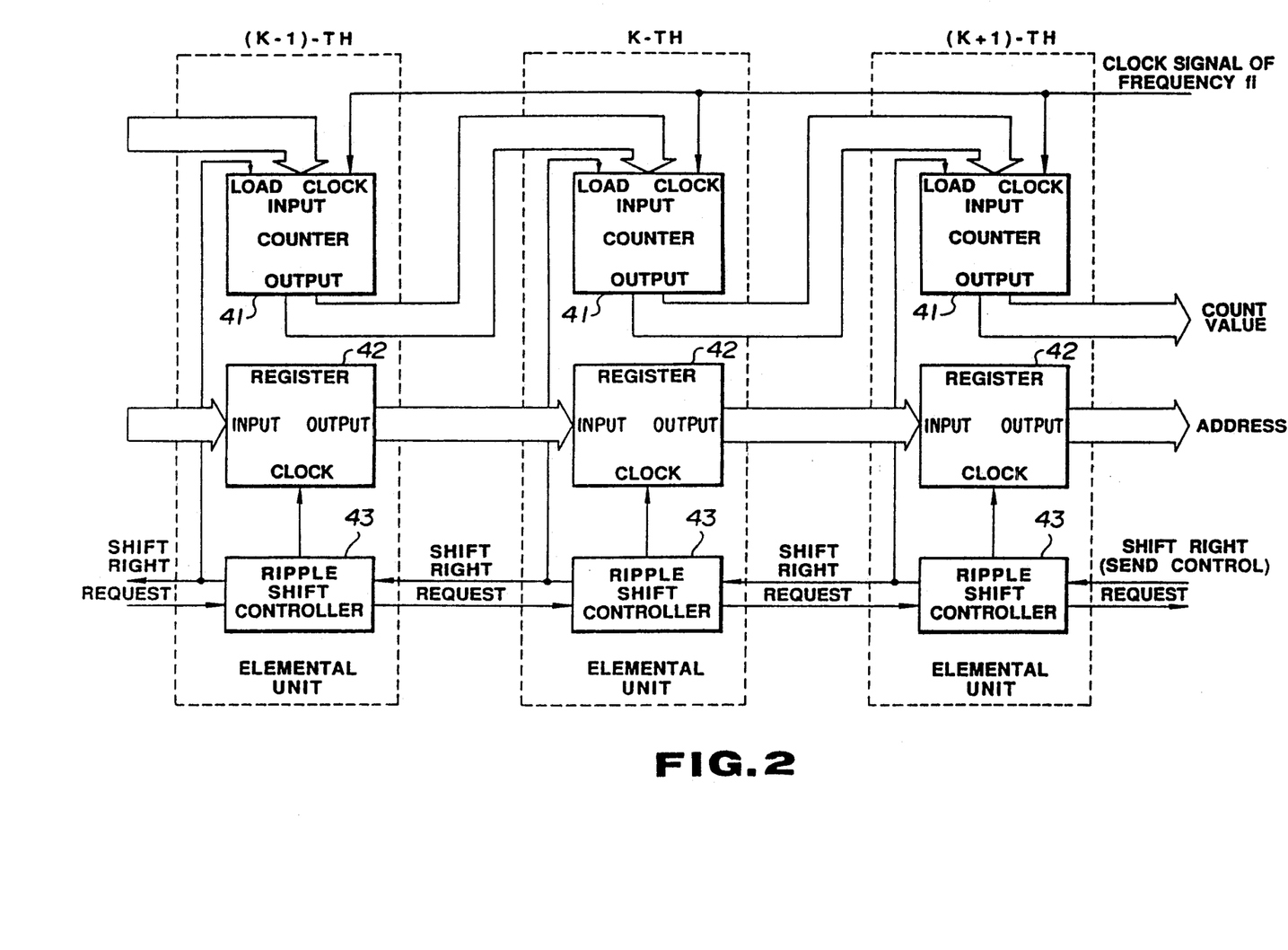
FIG. 2 is a block diagram showing the arrangement of elemental units in the embodiment of FIG. 1.

FIG. 2 shows the arrangement of the (k−1)-th, k-th and (k+1)-th elemental units in the i-th row as an example.

Each of these elemental unit has a counter 41, a register 42 and a ripple shift controller 43. The counter 41 receives the clock signal from the clock generator 30 (refer to FIG. 1) and counts the clock signal. The register 42 receives the sequentially shifted header H and address from the packet distributor 21 (refer to FIG. 1) and stores them therein.

The packet distributor 21 sends the header H and address to the register 42 of the first elemental unit, and at the same time the distributor also sends a request signal to the ripple shift controller 43 of the same elemental unit. The ripple shift controller 43, when the header H and address are already stored in the register 42 of its own elemental unit, sends a request signal to the ripple shift controller 43 of the next stage elemental unit or to the send controller 28 (refer to FIG. 1).

The send controller 28, when receiving the request signal from the ripple shift controller 43 of the last-stage elemental unit, sends a shift right signal to the ripple shift controller 43, and as a response to the shift right signal, the header H and address are sent from the register 42 of the last-stage elemental unit to the send controller 28. The ripple shift controller 43, when receiving a request signal from the packet distributor 21 or the ripple shift controller 43 of the previous-stage elemental unit, sends a shift right signal to the packet distributor 21 or the previous-stage ripple shift controller 43, and as a response to the shift right signal, the header H and address are sent from the packet distributor 21 or are sent from the previous-stage register 42.

The counter 41 of the first elemental unit in the i-th row, when the header H and address sent from the packet distributor 21 are stored in the register 42 of the same elemental unit, initializes or clears its old count value and starts its counting operation. The count value is shifted to the next-stage counter 41 each time the header H and address are shifted to the next-stage register 42 and the counting operation of the count value is also shifted to the next-stage counter. In this way, the counter 41 of the last elemental unit indicates a count value that has been counted during stay of the header H and address in the unit row.

Now explanation will be directed to the immediateness control of the send controller 28. First, assume that the aforementioned frequencies f1 to fn of the clock signals are weighted as associated with the immediateness classes 1 to n and a relationship $fj > fj+1$ is satisfied. In this case, a count value $D'j$ stored in the last elemental unit 27-j in the j-th row belonging to the immediateness class j increments faster than a count value $D'j+1$ stored in the last elemental unit 27-(j+1) in the (j+1)-th row. That is, a count interval $Tj$ of the count value $D'j$ in the last elemental unit 27-j of the j-th row is expressed by $1/fj$ and a count interval $Tj+1$ of the count value $D'j+1$ in the last elemental unit 27-(j+1) of the (j+1)-th row is expressed by $1/fj+1$. Therefore, if the relationship of $fj > fj+1$ is satisfied, then a relationship $Tj < Tj+1$ is satisfied so that the count value $D'j$ increments faster than the count value $D'j-1$.

The send controller 28 selects maximum one of the count values $D'1$ to $D'n$ indicated on the last-stage elemental units 27-1, 27-2, . . . , and 27-n. This selection is realized by carrying comparison operation expressed by the following expression (2).

$$\text{Max}\{D'1, D'2, \ldots, D'j, \ldots, D'n\} \quad (2)$$

$$1 \leq j \leq n$$

The send controller 28 reads out the header H and address from the last elemental unit indicating the selected maximum count value, sends the header H to the discard executer 39, and also sends the address to the usable pointer buffer 29a and to the data memory 35 through the packet pointer 33. The data memory 35 sends a packet stored at the received address, while the usable pointer buffer 29a places the received address at the end of the empty address queue Qempty.

In this way, in selecting maximum one of the count values $D'1$ to $D'n$ indicated at the elemental units 27-1, 27-2, . . . , and 27-n in the last stage, since the count value $D'j$ of the immediateness class j increments faster than the count value $D'j+1$ of the immediateness class j+1, the leading header H and address of the header/address queue stored in the j-th row of elemental units are preferentially selected over the leading header H and address of the header/address queue stored in the (j+1)-th row of elemental units. In other words, since the heading packet of the packet queue of immediateness class j is preferentially sent from the data memory 35 over the heading packet of the packet queue of immediateness class (j+1), the immediateness class j is higher in priority than the immediateness class (j+1).

The above operation will be briefly explained. Each time a packet is input to the data memory 35, the heading address of the empty address queue Qempty is sent to the data memory 35 and the packet distributor 21. And the packet is stored in the data memory 25 at the address, while the header H and address of the packet are sent through the packet distributor 21 to the elemental unit corresponding to the immediateness class indicated by the priority data of the header H. Further, the send controller 28 reads out the header H and address from the last elemental units 27-1, 27-2, . . . , and 27-n on the basis of the expression (2), sends the header H to the discard executer 39, and sends the read-out address to the data memory 35 through the usable pointer buffer 29a and the read packet pointer 33. As a result, the data buffer 35 outputs the heading packet of any of the packet queues of the immediateness classes 1 to n. The address sent from the send controller 28 corresponds to an address showing the position of a packet already used when the packet of that address is read out by the data memory 35, and the address is added to the end of the empty address queue Qempty within the usable pointer buffer 29a. Accordingly, formed in the usable pointer buffer 29a is an empty address queue Qempty consisting of a plurality of addresses not used.

The weight coefficient $Wj$ in the expression (1) in the prior art and the unit time $Tj$ in the expression (2) in the present embodiment satisfy a relationship (3) which follows $$W1:W2:\ldots:Wj:\ldots:Wn = 1/T1:1/T2:\ldots:1/Tj:\ldots:1/Tn \quad (3)$$

In this way, the present embodiment is designed so that, when packets of the immediateness class 1 to n are input, the count values $D'1$ to $D'n$ of these packets are counted at intervals determined according to the immediateness classes, maximum one of these count values $D'1$ to $D'n$ is selected, and the packet corresponding to the selected count value is preferentially transmitted. For this reason, the selection of a packet to be immediately transmitted can be realized only through the comparison operation between the count values $D'1$ to $D'n$ and thus high speed processing can be attained. Further, since such a simple arrangement as a register, a counter and so on are cascade-connected in an FIFO form is employed, the buffer elemental unit can be readily made in the form of an integrated circuit.

The discarding control of this embodiment will next be explained below.

The discard class deciding part 37 includes a discard class discriminator 37a which receives a packet from the data bus interface 11 and discriminates the discard class of the received packet on the basis of the priority data contained in the header H of the received packet for every packet. In the illustrate embodiment, discard classes 1 to M are previously determined so as to be associated with flow rate counters 37b-1 to 37b-M which are provided in the next stage of the discard class discriminator 37a. The discard class discriminator 37a, after discriminating the discard class of the received packet, sends a pulse to the flow rate counter corresponding to the discriminated discard class. For example, when the packet belongs to the discard class 1, the discard discriminator 37a sends a pulse to the flow rate counter 37b-1 corresponding to the discard class 1. When the packet belongs to the discard class 2, the discard discriminator 37a sends a pulse to the flow rate counter 37b-2 corresponding to the discard class 2.

Similarly, when the packet belongs to the discard class n, the discard discriminator 37a sends a pulse to the flow rate counter 37b-n corresponding to the discard class n.

Each of the flow rate counters 37b-1 to 37b-M counts its pulse, calculates the number of input packets per unit time t, i.e., a flow rate a, and stores therein the packet flow rate a. In this way, flow rates a1 to aM of the discard classes 1 to M are stored in the flow rate memories 37c-1 to 37c-M respectively.

The discard class deciding part 37 also includes product calculators 37d-1 to 37d-M which extract the flow rates a1 to aM from the flow rate memories 37c-1 to 37c-M, which calculate products a1 $\alpha$1 to aM $\alpha$M of these flow rates a1 to aM and allowable discard rate $\alpha$1 to $\alpha$M previously determined for the discard classes 1 to M, and which instruct a discard class decider 37e of these products, respectively. In this connection, the word "allowable discard rate" indicates a ratio of a discardable-packet flow rate to a packet flow rate of discard class.

The discard class decider 37e selects maximum one of the products a1 $\alpha$1 to aM $\alpha$M. This selection is carried out by performing the following operation.

$$\text{Max } \{a1\alpha1, a2\alpha2, \ldots, aj\alpha j, \ldots, aM\alpha M\} \quad (4)$$

$$1 \leq j \leq M$$

In this case, assuming that the allowable discard rates $\alpha$1 to $\alpha$M are weighted as associated with the discard classes 1 to M and a relationship $\alpha j > \alpha j+1$ is satisfied, then the product aj $\alpha j$ for the discard class j is preferentially selected over the product aj+1 $\alpha j+1$ for the discard class j+1.

In this way, the discard class decider 37e always selects maximum one of the products a1 $\alpha$1 to aM $\alpha$M previously.

On the other hand, the empty address number memory 29b of the empty queue manager 29, when the number of addresses within the usable pointer buffer 29a is reduced to, for example, less than 2, applies an approval signal to the discard class decider 37e.

The discard class decider 37e, when receiving the approval signal, informs the discard executer 39 of the discard class leading to the maximum product of the products a1 $\alpha$1 to aM $\alpha$M and also instructs the switch 36 and compensator 38 of the execution of compensation. For example, when the product a1 $\alpha$1 is selected, the discard class 1 leading to the product a1 $\alpha$1 is instructed to the discard executer 39, when the product a2 $\alpha$2 is selected, the discard class 2 leading to the product a2 $\alpha$2 is instructed to the discard executer 39. Similarly, when the product an $\alpha$n is selected, the discard class n leading to the product an $\alpha$n is instructed to the discard executer 39.

The compensator 38, like the usable pointer buffer 29a, indicates a preliminary address queue Queue consisting of a plurality of addresses. The compensator 38, when receiving the approval signal from the discard class decider 37e, sends the heading address of the preliminary address queue Queue. The switch 36, when receiving the approval signal from the discard class decider 37e, once changes over from the connection between the send controller 28 and usable pointer buffer 29a to the connection between the compensator 38 and usable pointer buffer 29a to thereby send the address from the compensator 38 to the usable pointer buffer 29. This address is added to the end of the empty address queue Qempty within the usable pointer buffer 29a. Thereafter, the switch 36 changes over from the connection between the compensator 38 and usable pointer buffer 29a back to the connection between the send controller 28 and usable point buffer 29a.

Accordingly, when the number of addresses within the usable pointer buffer 29a becomes less than 2 as mentioned above, the heading address of the preliminary address queue of the compensator 38 is added to the end of the empty address queue Qempty of the usable pointer buffer 29a. As a result, the number of addresses within the usable pointer buffer 29a is incremented by 1 to compensate for the empty address queue Qempty.

Figure 3:
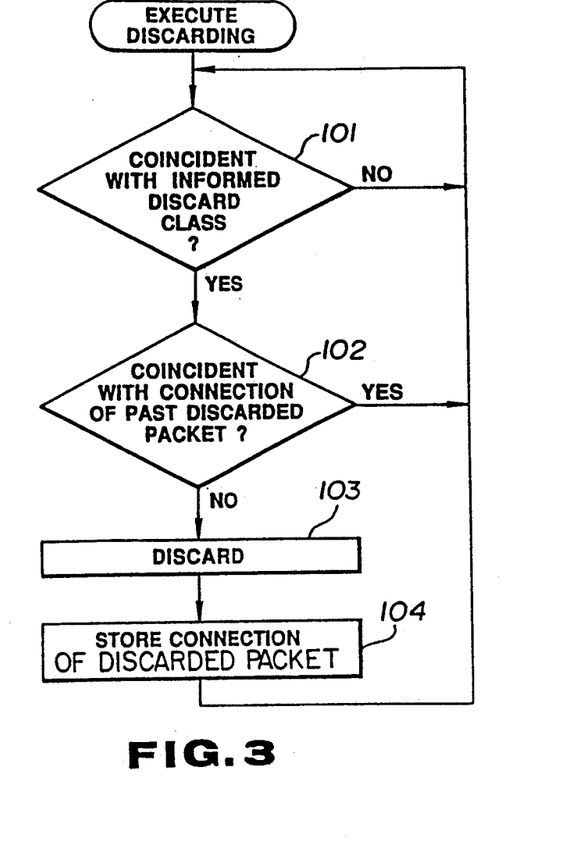
FIG. 3 is a flowchart for partially explaining the operation of the embodiment of FIG. 1.

The discard executer 39 includes a discarder 39a which, when receiving the instruction of the discard class from the discard class decider 37e, executes such processing as shown by a flowchart in FIG. 3.

Now, the send controller 28 performs the immediateness control in response to a send request timing signal received through the OR circuit 40 from the line interface 16 to thereby any one of the last elemental units 27-1 to 27-n successively, and sequentially sends the header H and address within the selected elemental unit to the discarder 39a. The discarder 39a, when receiving the header H from the send controller 28, collates the discard class designated by the header H with the discard class instructed by the discard class decider 37e to determine whether or not the both discard classes coincide with each other (step 101).

If a coincidence is not found between the both discard classes, then the discarder 39a waits until it receives the next header H and address from the send controller 28. If a coincidence is found, then the discarder 39a discriminates the connection of the packet designated by the received header H. The word "connection" refers to a transmission route between two terminals for packet transmission and reception.

The discarder 39a collates the discriminated connection with a connection already stored therein (step 102) and when finding a coincidence between the both connections, waits until the discarder receives the next header H and address from the send controller 28. If the discarder 39a fails to find a coincidence between the both, then it receives an address following the previously received header H from the send controller 28 to inhibit the received address from being sent to the usable pointer buffer 29a and the read packet pointer 33 (step 103). This causes the packet so far stored at the address, i.e., the packet of the discard class determined by the discard class decider 37e to be prevented from being sent from the data memory 35, which means that the packet has been discarded.

When the packet has been discarded, the discarder 39a immediately sends a packet send request timing signal to the send controller 28 through the OR circuit 40, thus preventing the send missing of a packet to be sent from the line interface 16 of FIG. 8 in response to the packet send request timing signal.

Thereafter, the discarder 39a stores the connection designated by the received header H in the memory 39b (step 104) and also attaches the received address to the end of the preliminary address queue Queue within the compensator 38. The memory 39b stores and holds the connection until a predetermine time elapses, and after passage of the predetermined time, erases the stored connection.

In the event where the discard class designated by the header H sent from the send controller 28 coincides with the discard class designated by the discard decider 37e and the connection designated by the header H does not coincide with the connection stored in the memory 39b for the predetermined time; an address following the header H is prevented from being sent to the read packet pointer 33 and the address is attached to the end of the preliminary address queue Queue of the compensator 38. Since the address is intended to be later moved from the compensator 38 to the usable pointer buffer 29a to be used to store the packet in the data memory 35, it is ensured that the packet stored at the address to be discarded is sent from the data memory 35. Further, the old connection of the packet previously discarded is still stored in the memory 39b for the predetermined time so that, when the old connection coincides with the connection of the packet to be now discarded, the discarding of the packet is stopped. As a result, it can be prevented that packets on the same connection are continuously discarded for the predetermined time and thus the remarkable deterioration of communication quality caused by the connection of the discarded packets can be suppressed.

For the purpose of preventing the continuous discarding of packets on the same connection, it is possible to sequentially store up to a predetermined number of connections in the memory 39b each time a packet on each connection is discarded, and when a packet on a connection different from any of the connections stored within the memory 39b has been newly discarded, to store the different connection in the memory 39b and at the same time to erase one of the connections first stored in the memory 39b. In this case, it will be avoided that packets on the same connection are continuously discarded regardless of time passage.

The above discarding control will then be summarized by referring to FIG. 4.

Figure 4A:
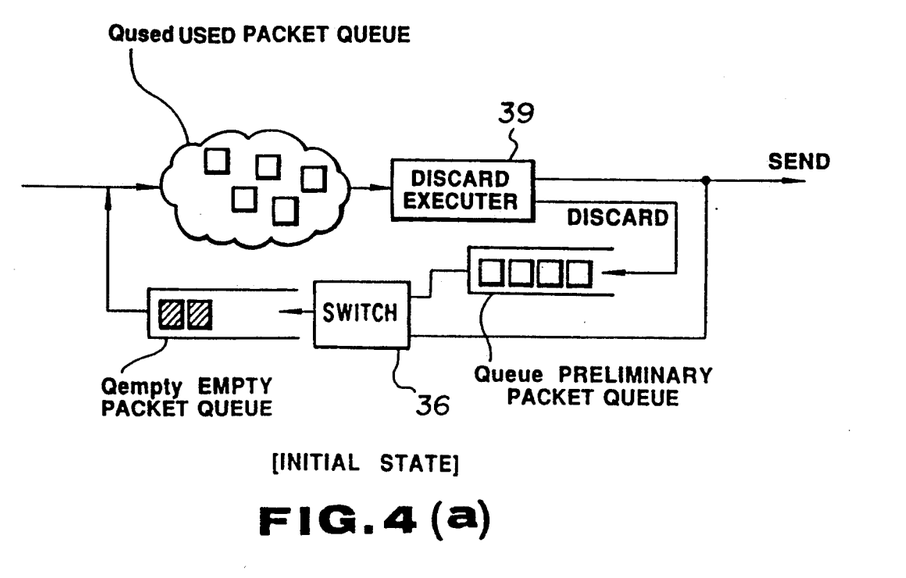
FIGS. 4(a) to 4(d) illustrate general operations of the embodiment of FIG. 1.

First, in FIG. 4(a), the empty address queue Qempty within the usable pointer buffer 29a is commonly used by the header/address queues of the different immediateness classes 1 to n divided for immediateness control. This is for the purpose of avoiding such a situation that, when an empty address queue is formed for each header/address queue, it becomes impossible to effectively use the data memory 35 (refer to FIG. 1). In the case where the empty address queue Qempty is arranged to be commonly used in this way, when a used address queue consisting of the addresses of all the staying packets is denoted by Qused, a maximum address queue Qmax is expressed as follows.

$$Qmax = Qused + Qempty \quad (5)$$

where when the number of addresses in the empty address queue Qempty becomes zero and the number of addresses in the used address queue Qused becomes equal to the number of addresses in the maximum address queue Qmax, it becomes impossible to arrange a new address in the used address queue Qused.

Figure 4B:
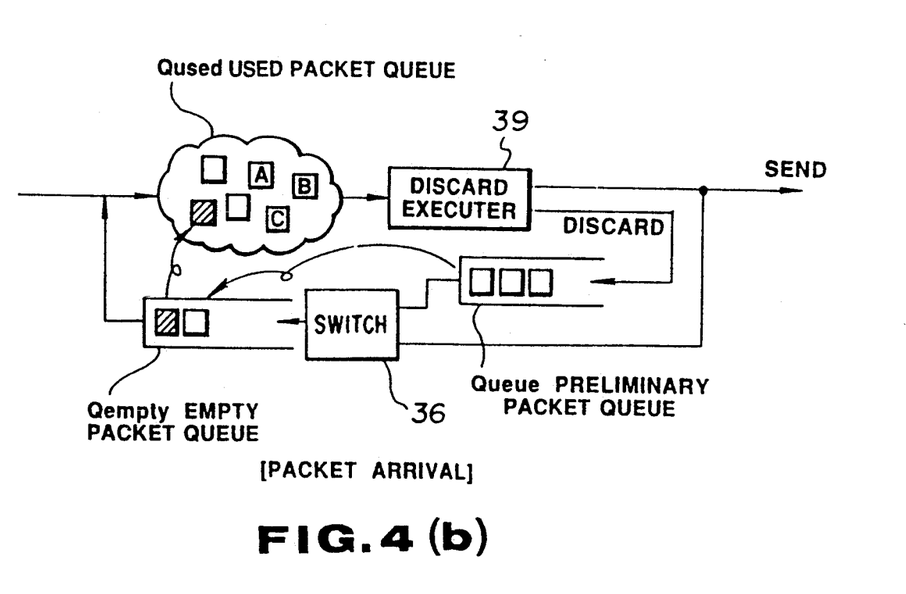

Under such a condition, as shown in FIG. 4(b), when the number of addresses in the empty address queue Qempty becomes less than 2, one of the discard classes 1 to M is selected and to discard the packet of the selected discard class, an address A of the packet is decided to be discarded from the used address queue Qused. At this time, since the number of addresses in the used address queue Qused is decreased by 1, the effective length of the maximum address queue Qmax become short. To avoid this, one address is given to the empty address queue Qempty from the preliminary address queue Queue to prevent the effective length of the maximum address queue Qmax from being shortened.

Figure 4C:
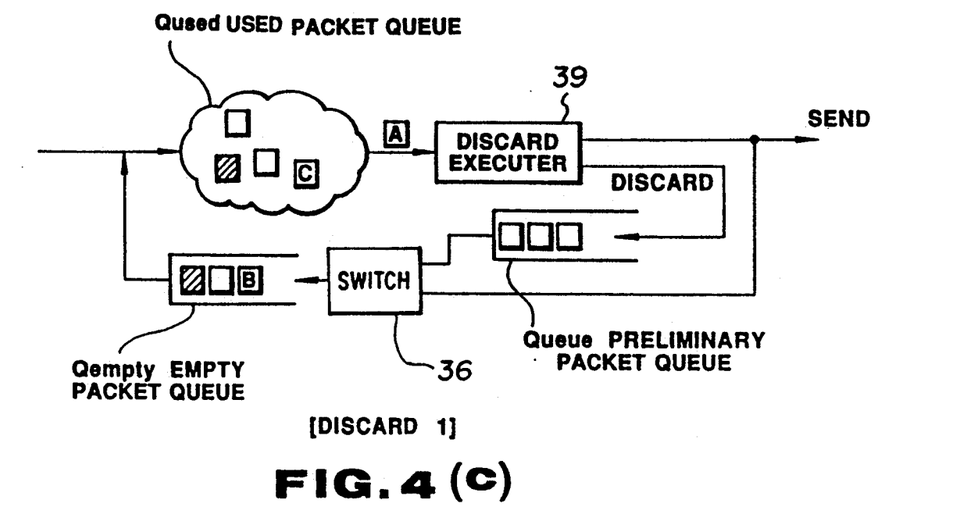

In FIG. 4(c), each time the discard executer 39 sequentially receives the address A from the used address queue Qused under the immediateness control, the discard executer 39 discriminates the discard class of the address A. When receiving from the used address queue Qused an address B that is not to be discarded, the discard executer 39 sends the address B to the empty address queue Qempty through the switch 36. Thereafter, in the event where the discard executer 39 receives the address A belonging to the class to be discarded from the used address queue Qused, the executer 39 confirms that the discarding of the received address A causes no continuous discarding of packets on the same connection and then discards the address A.

Figure 4D:
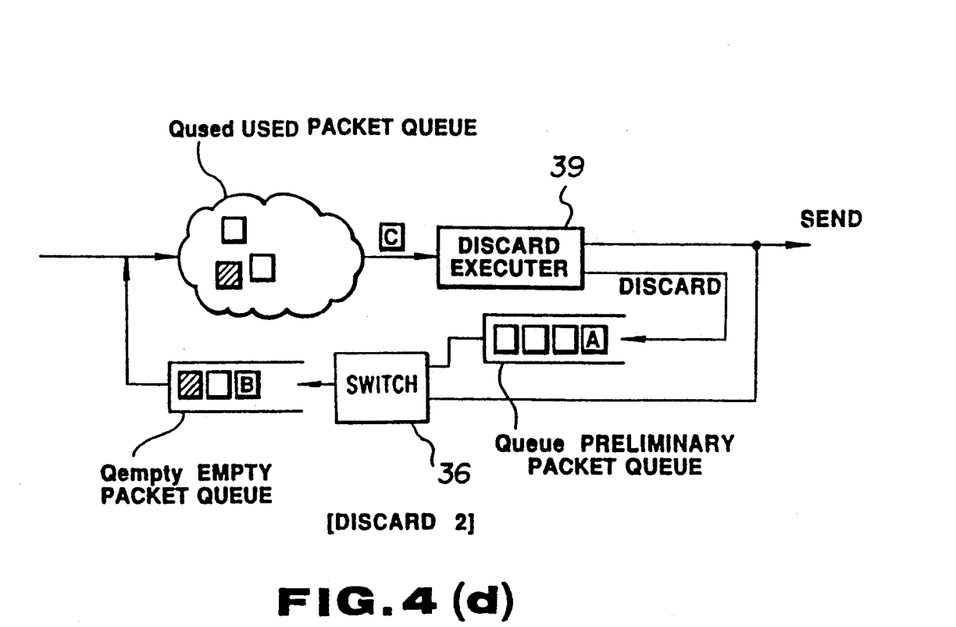

Next, as shown in FIG. 4(d), immediately after the discard executer 39 discards the address A, the executer receives an address C from the used address queue Qused. At this time, the discard executer 39 discards the address A to the preliminary address queue Queue. The preliminary address queue Queue already gave one address to the empty address queue Qempty and thus is now short in queue length. However, now that the preliminary address queue Queue receives the address A discarded from the discard executer 39, the queue Queue can have the original length.

Accordingly, according to the present embodiment, the heading packet in the packet queue is not always discarded but a discardable packet therein can be selectively discarded.

In accordance with the packet communication system of the present invention, since only simple comparison operation enables the selection of a packet to be immediately transmitted, high speed processing can be realized. Further, since a buffer elemental unit can have such a simple circuit of a register, a counter and so on cascade-connected in an FIFO manner, the elemental unit can be easily made in the form of an integrated circuit. In addition, the heading packet in the packet queue is not always discarded but a discardable packet therein can be selectively discarded. As a result, the communication quality of packet communication can be improved and a low cost system can be realized.

What is claimed is:

1. A packet communication system comprising:
   data memory means for storing received packet data into each address thereof;
   means for distributing the received packet data in accordance with assigned immediateness priority classes on the basis of immediateness priority data contained in the received packet data header;
   a plurality of address queue means provided for the respective immediateness priority classes, each address queue means having a plurality of element units connected in series, for storing address data of the data memory means storing the data of the packets distributed by the packet distributing means into each element unit assigned for each immediateness priority class and, for sequentially shifting the address data stored in the element units;
   each of the plurality of address queue means assigned for each immediateness priority class storing in each element unit thereof as the address data a header address of each memory area of the data memory means which stores the packet data;

a plurality of counting means, each provided in each element unit of the plurality of address queue means, for counting clocks of different frequencies respectively corresponding to each immediateness priority class of the received packets with respect to each address data during a time period in which the address data is shifted from a first stage element unit to a last stage element unit in each address queue means; and transmission control means for comparing counted values of the counting means in each of the last stage element units of the respective address queue means to select one of the address queue means having a maximum counted value and to extract address data from the last stage element unit of the selected address queue means.

2. A packet communication system comprising:

data memory means for storing received packet data;

means for identifying a discardness priority class to which the received packet data belongs on the basis of discardness priority data contained in the received packet data header;

flow rate counting means for counting the number of packet data received in a predetermined time period for each discardness priority class identified by the identifying means to count a packet flow rate for each of the discardness priority classes;

means for setting an allowable discard rate for each of the discardness priority classes identified by the identifying means;

means for multiplying the packet flow rate of each discardness priority class counted by the flow rate counting means and the allowable discard rate of each discardness priority class set by the setting means to obtain a product for each of the discardness priority classes;

means for detecting a memory residual capacity of the data memory means;

determining means, when the memory residual capacity of the data memory means detected by the detecting means becomes less than a predetermined value, for comparing the products of the respective discardness priority classes obtained by the multiplying means to determine the discardness priority class of a maximum one of the products; and means for preferentially discarding the packet data belonging to the discardness priority class determined by the determining means from among the packet data stored in the data memory means.

3. A packet communication system comprising:

data memory means for storing received packet data into each address thereof;

means for distributing the received packet data in accordance with assigned immediateness priority classes on the basis of immediateness priority data contained in the received packet data;

a plurality of address queue means provided for each immediateness priority class, each address queue means having a plurality of element units connected in series, for storing address data of the data memory means storing the packet data distributed by the packet distributing means into each element unit assigned for each immediateness priority class, and for sequentially shifting the address data stored in each of the element units;

a plurality of counting means, each provided in each element unit of the plurality of address queue means, for counting clocks of different frequencies respectively corresponding to each immediateness priority class of the received packets with respect to each address data during a period in which the address data is shifted from a first stage element unit to a last stage element unit in each address queue means;

transmission control means for comparing counted values of the counting means for each of the last stage element unit in the respective address queue means to select one of the address queue means having a maximum counted value and to extract the address data from the last stage element unit in the selected address queue means;

means for reading out from the data memory means the packet data stored in an address designated by the address data extracted by the transmission control means;

means for identifying a discardness priority class to which the received packet data belongs on the basis of discardness priority data contained in the received packet information;

flow rate counting means for counting the number of packet data received within a predetermined time period for each discardness priority class identified by the identifying means to count a packet flow rate for each discardness priority class;

means for setting an allowable discard rate for each discardness priority class identified by the identifying means;

means for multiplying the packet flow rate of each discardness priority class counted by the flow rate counting means and the allowable discard rate of each discardness priority class set by the setting means to obtain a product for each discardness priority class;

means for detecting a memory residual capacity of the data memory means;

determining means, when the memory residual capacity of the data memory means detected by the detecting means becomes less than a predetermined value, for comparing the products of the respective discardness priority classes obtained by the multiplying means to determine a discardness priority class of a maximum one of the products;

means for storing connection data of the discarded packet data on the basis of connection data contained in the received packet data; and means for checking whether the discardness priority data belonging to the discard class determined by the discard class determining means are stored in the last stage element units of the plurality of address queue means, and if there is a last element unit in which the discardness priority data belonging to the discarded class determined by the determining means is stored, for discarding the packet data corresponding to the address data stored in this last element unit under a condition that the connection data stored in this last element unit differs from the connection data stored in the connection data memory means.

* * * * *